United States Patent Office 3,696,091
Patented Oct. 3, 1972

3,696,091
NOVEL CARDIAC-ACTIVE PRINCIPLES OF THE CARDENOLIDE GLYCOSIDE CLASS
Wolfgang Eberlein and Josef Nickl, Biberach (Riss), Joachim Heider, Warthausen-Oberhofen, and Gerhard Dahms, Biberach (Riss), Germany, and Walter Kobinger, Vienna, Austria, assignors to Boehringer Ingelheim G.m.b.H., Ingelheim (Rhine), Germany
No Drawing. Filed June 3, 1970, Ser. No. 43,198
Int. Cl. C07c 173/00
U.S. Cl. 260—210.5                                       6 Claims

ABSTRACT OF THE DISCLOSURE

Cardenolide glycosides of the formula

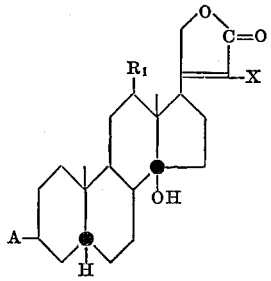

wherein
$R_1$ is hydrogen, hydroxyl or acyloxy,
X is chlorine, fluorine, alkyl of 1 to 4 carbon atoms or alkoxy of 1 to 4 carbon atoms, and
A is digitoxosyl of the formula

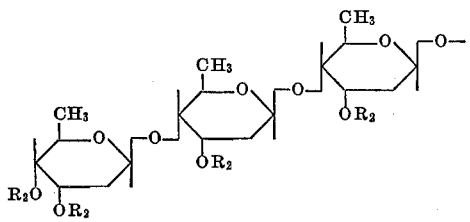

where $R_2$ is hydrogen or acyl; the compounds are useful as cardiac-active principles having a positive inotropic activity in warm-blooded animals.

---

This invention relates to novel cardiac-active principles of the cardenolide glycoside class, as well as to a method of preparing these compounds.

More particularly, the present invention relates to cardenolide glycosides of the formula

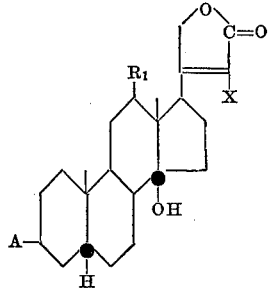

(I)

wherein
$R_1$ is hydrogen, hydroxyl or acyloxy,
X is chlorine, fluorine, alkyl of 1 to 4 carbon atoms or alkoxy of 1 to 4 carbon atoms, and
A is digitoxosyl of the formula

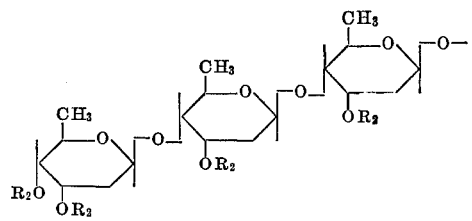

where $R_2$ is hydrogen or acyl.

A cardenolide glycoside of the Formula I is prepared according to the present invention by intra-molecular cyclization of a steroid ester of the formula

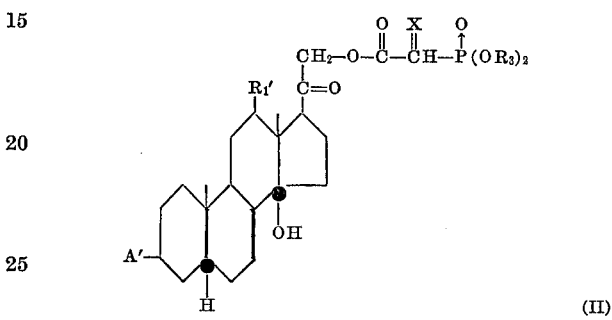

(II)

wherein
X has the same meanings as in Formula I,
$R_1'$ is hydrogen, acyloxy, or a hydroxyl group which is protected by another easily removable protective radical, such as trialkylsilyl, tetrahydropyranyl or trichloroethylcarbonyl,
$R_3$ is lower alkyl, and
$A'$ is digitoxosyl of the formula

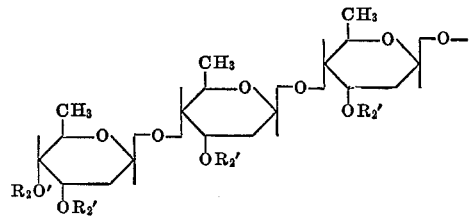

where
$R_2'$ is acyl or another easily removable protective radical, such as trialkylsilyl, tetrahydropyranyl or trichloroethylcarbonyl,
in the presence of a base.

In those instances where the starting compound of the Formula II is one in which the substituents $R_1'$ and/or $R_2'$ are protected groups different from the desired substituents $R_1$ and $R_2$, respectively, in the end product of the Formula I, the protective groups in the intermediate cardenolide glycoside are split off and the resulting compound of the Formula I wherein $R_1$ is hydroxyl and/or $R_2$ is hydrogen is subsequently acylated, if so desired.

The intra-molecular cyclization is performed in the presence of a base, such as an alkali metal alcoholate, an alkali metal hydride, an alkali metal amide, an alkali metal hydroxide or an alkali metal carbonate, and advantageously in the presence of an inert organic solvent, such as dimethylglycol ether, at temperatures between —40 and +50° C. preferably between 0 and +20° C.

In addition to the above-mentioned protective groups for hydroxyl groups, all other customary protective groups for hydroxyl may be employed, such as benzyl, carbobenzoxy, benzoyl, phosphonoacyl or the like.

The removal of the acyl or phosphonoacyl protective groups may, for example, be effected by mild alkaline or acid hydrolysis; the removal of benzyl or carbobenzoxy protective groups may, for instance, be effected by means of catalytic hydrogenation; and trimethylsilyl or tetrahydropyranyl protective groups may be removed by treatment with dilute acids.

The optional acylation of a compound of the Formula I, wherein $R_1$ is hydroxyl and/or $R_2$ is hydrogen, may be effected by reaction with a carboxylic acid anhydride or a carboxylic acid halide, for example.

If the starting compound of the Formula II for the intra-molecular cyclization is one wherein the protective groups are already identical to the desired acyl radicals $R_1$ and/or $R_2$ in Formula I, the cyclization yields the desired acyl-substiuted compound of the Formula I directly.

The steroid esters of the Formula II used as starting compounds for the intra-molecular cyclization are themselves new compounds. These steroid esters are prepared by esterification of an α-ketol of the formula

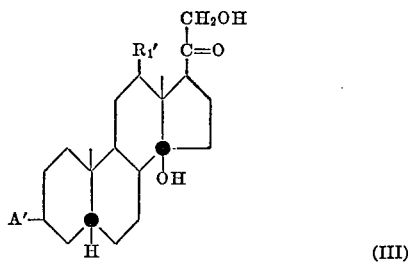

(III)

wherein A' and $R_1'$ have the same meanings as in Formula II, with a phosphono-acid of the formula

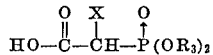

wherein $R_3$ and X have the same meanings as in Formulas II and I, respectively.

The esterification is advantageously carried out in an inert organic solvent, for example in benzene, preferably in the presence of a dehydrating agent, such as dicyclohexylcarbodiimide, or carbonyl- or thionyl-N,N'-diimidazole, at temperatures between —20 and +50° C., preferably at 20° C. The reaction may also be performed with the reactive derivatives of a phosphono-acid of the Formula IV produced in situ, for example with its acid halides or anhydrides, advantageously in the presence of an acid-binding agent, for instance a tertiary organic base, such as pyridine, or an inorganic base.

If the esterification is performed with the ketol obtained from digitoxin or digoxin and with a phosphono-acid of the Formula IV, a starting material of the Formula II is obtained in which the protective groups represent a corresponding phosphonoacyloxy or phosphonoacyl group.

The α-ketols of the Formula III are produced according to methods known from the literature [see, for example, K. Meyer and T. Reichstein, Helv. Chim. Acta 30, 1508 (1947)].

Some of the phosphono-acids of the Formula IV are known from the literature. They may be prepared from the corresponding phosphono-acid esters by mild equimolar alkaline hydrolysis, by subsequent acidification with a mineral acid and extraction with an organic solvent [see, for example, H. W. Kofen, J. Amer. Chem. Soc. 79, 1963 (1957); W. Grell and H. Machleidt, Liebigs Ann. Chem. 693, 134 (1966) and 699, 53 (1966); D. J. Martin and C. E. Griffin, J. Org. Chem. 30, 4034 (1965); and G. Ackermann, J. Amer. Chem. Soc. 79, 6524 (1957)].

The following examples further illustrate the present invention and will enable others skilled in the art to understand it more completely. It should be understood, however, that the invention is not limited solely to the particular examples given below.

EXAMPLE 1

(a) 22-n-butoxy-digitoxin tetraacetate 8 gm. (8.8 millimols) of 3β-[O-(3,4-di-O-acetyl-β-D-digitoxosyl)-(1→4)-O-(3-O-acetyl-β-D-digitoxosyl)-(1→4)-(3-O-acetyl-β-D-digitoxosyl)] - 3β,14β,21 - trihydroxy-20-oxo-5β-pregnane were dissolved in 120 ml. of absolute benzene and, while cooling the solution with ice, first a solution of 3.1 gm. of α-diethyl-phosphono-2-n-butoxy-acetic acid (11.5 millimols) in 10 ml. of benzene and then a solution of 2.5 gm. (12.1 millimols) of N,N'-dicyclohexylcarbodiimide in 10 ml. of benzene were added to the reaction mixture. After stirring for 3 to 4 hours at room temperature, the N,N'-dicyclohexyl-urea which precipitated during the reaction was filtered off, and the filtrate was evaporated to dryness in vacuo. The residual oily foam was 3β-[O-(3,4-di-O-acetyl-β-D-digitoxosyl)-(1→4)-O-(3-O-acetyl-β-D-digitoxosyl)-(1→4) - (3 - O-acetyl-β-D-digitoxosyl)]-3β,14β,21-trihydroxy-21 - (2 - diethylphosphono-2-n-butoxy-acetyl)-20-oxo-5β - pregnane. Rf-value: 0.3 (silica gel; solvent system: ethyl acetate/benzene=4/1).

The obtained crude product was taken up in 120 ml. of dimethylglycol, and 1.33 gm. (11.9 millimols) of potassium tert.-butylate were added to the solution while cooling with ice. After standing for 1 hour at room temperature the reaction solution was poured into 250 ml. of dilute hydrochloric acid and extracted with chloroform. The combined extracts were washed, dried and evaporated in vacuo. For further purification the crude product was subjected to chromatography on silica gel (system: benzene/ethyl acetate=19/10).

Yield: 3.4 gm. (38% of theory)
$[\alpha]_D^{20}$=+51° (in methanol, c.=0.76)
Rf-value: 0.7 (silica gel; solvent system: ethyl acetate/benzene=4/1).

(b) 22-n-butoxy-digitoxin 2.8 gm. (2.78 millimols) of 22-n-butoxy-digitoxin-tetraacetate were dissolved with 2.3 gm. (13.2 millimols) of potassium carbonate in 200 ml. of methanol by addition of 5 ml. of water, and the solution was stirred for about 2 hours at 50–60° C. After completion of the reaction, the solution was diluted with ethyl acetate, dried with sodium sulfate and, after filtration, the solvent was removed from the filtrate in vacuo. The residue was subjected to chromatography on silica gel (system: ethyl acetate/ethanol=20/1).

Yield: 2.1 gm. (90% of theory)
$[\alpha]_D^{20}$=+6.5° (in methanol, c.=1.3)
Rf-value: 0.65 (silica gel; solvent system: ethyl acetate/ethanol=87/13).

EXAMPLE 2

(a) 22-methyl-digitoxin-tetraacetate

Analogous to Example 1(a), starting from 8 gm. (8.8 millimols) of 3β-[O-(3,4-di-O-acetyl-β-D - digitoxosyl)-(1→4)-O-(3-O-acetyl-β-D-digitoxosyl)-(1→4) - (3 - O-acetyl-β-D-digitoxosyl)]3β,14β,21-trihydroxy-20-oxo - 5β-pregnane and 2.4 gm. (11.4 millimols) of 2-diethylphosphono-2-methyl-acetic acid, and condensation with 2.5 gm. (12.1 millimols) of dicyclohexylcarbodiimide, the corresponding α-ketol-phosphono-ethyl acetate was obtained.

Rf-value: 0.2 (silica gel; solvent system: ethyl acetate/benzene=4/1).

Upon treating the obtained product with 1.33 gm. (11.9 millimols) of potassium tert.-butylate, 2.6 gm. (31% of theory) of 22-methyl-digitoxin tetraacetate were obtained which were subjected to chromatography on silica gel (system: benzene/ethyl acetate=17/10).

$[\alpha]_D^{20}$=+55° (in methanol, c.=1.9)
Rf-value: 0.65 (silica gel; solvent system: ethyl acetate/benzene=4/1).

(b) 22-methyl-digitoxin

Analogous to Example 1(b), starting from 2 gm. (2.11 millimols) of 22-methyl-digitoxin tetraacetate and hydrolysis with 1.74 gm. (10 millimols) of potassium carbonate in 195 ml. of methanol and 10 ml. of water, 1.2 gm. (73.5% of theory) of 22-methyl-digitoxin were obtained, which were subjected to chromatography on silica gel (system: ethyl acetate).

$[\alpha]_D^{20} = +7.9°$ (in methanol, c.=1.1)
Rf-value: 0.65 (silica gel; solvent system: ethyl acetate/ethanol=87/13).

EXAMPLE 3

(a) 22-methoxy-digitoxin tetraacetate

Analogous to Example 1(a), starting from 8 gm. (8.8 millimols) of 3β-[O-(3,4-di-O-acetyl-β-D-digitoxosyl)-(1→4)-O-(3-O-acetyl - β - D-digitoxosyl)-(1→4)-(3-O-acetyl-β-D-digitoxosyl)] - 3β,14β,21-trihydroxy-20 - oxo-5β-pregnane and 2.6 gm. (11.5 millimols) of 2-diethyl-phosphono-2-methoxy-acetic acid and condensation with 2.6 gm. (12.1 millimols) of dicyclohexylcarbodiimide, the corresponding α-ketol-phosphono-ethyl acetate was obtained.

Rf-value: 0.3 (silica gel; solvent system: ethyl acetate/benzene=4/1).

Upon treating the obtained product with 1.33 gm. (11.9 millimols) of potassium tert.-butylate, 2.2 gm. (26% of theory) of 22-methoxy-digitoxin tetraacetate were obtained. The raw product was purified by chromatography on silica gel (system: benzene/ethyl acetate=17/10).

$[\alpha]_D^{20} = +54°$ (in methanol, c.=1.7).
Rf-value: 0.7 (silica gel; solvent system: ethyl acetate/benzene=4/1).

(b) 22-methoxy-digitoxin

Analogous to Example 1(b), starting from 1.5 gm. (1.56 millimols) of 22-methyl-digitoxin tetraacetate and hydrolysis with 1.29 gm. (7.4 millimols) of potassium carbonate in 145 ml. of methanol and 5 ml. of water, 1.0 gm. (81% of theory) of 22-methoxy-digitoxin was obtained, which was subjected to chromatography on silica gel (system: benzene/ethanol=20/1).

$[\alpha]_D^{20} = +9.8°$ (in methanol, c.=1.2).
Rf-value: 0.65 (silica gel; solvent system: ethyl acetate/ethanol=87/13).

EXAMPLE 4

(a) 22-ethoxy-digitoxin tetraacetate

Starting from 8 gm. (8.8 millimols) of 3β-[O-(3,4-di-O-acetyl-β-D-digitoxosyl) - (1→4)-O-(3-O-acetyl-β-digitoxosyl)-(1→4) - (3-O-acetyl-β-D - digitoxosyl)]-3β,14β,21-trihydroxy-20-oxo-5β-pregnane and 2.75 fm. (11.5 millimols) of 2-diethylphosphono-2-ethoxy-acetic acid and condensation with 2.5 gm. (12.1 millimols) of dicyclohexylcarbodiimide analogous to Example 1(a), the corresponding α-ketol-phosphono-ethyl acetate was obtained.

Rf-value: 0.25 (silica gel; solvent system: ethyl acetate/benzene=4/1).

Upon treating the obtained product with 1.33 gm. (11.9 millimols) of potassium tert.-butylate, 2.9 gm. (34% of theory) of 22-ethoxy-digitoxin tetraacetate were obtained, which were subjected to chromatography on silica gel (system: benzene/ethyl acetate=18/10).

$[\alpha]_D^{20} = +54°$ (in methanol, c.=1.1).
Rf-value: 0.7 (silica gel; solvent system: ethyl acetate/benzene=4/1).

(b) 22-ethoxy-digitoxin

Starting from 2.3 gm. (2.35 millimols) of 22-ethoxy-digitoxin tetraacetate and hydrolysis with 1.93 gm. (11.1 millimols) of potassium carbonate in aqueous methanol analogous to Example 1(a), 1.8 gm. (94% of theory) of 22-ethoxy-digitoxin were obtained, which were subjected to chromatography on silica gel (system: ethyl acetate/ethanol=20/1).

Yield: 1.8 gm. (94% of theory)
$[\alpha]_D^{20} = +8.2°$ (in methanol, c.=0.7)
Rf-value: 0.65 (silica gel; solvent system: ethyl acetate/ethanol=87/13).

EXAMPLE 5

(a) 22-methoxy-digoxin pentaacetate

Analogous to Example 1(a), starting from 10 gm. (10.3 millimols) of 3β-[O-(3,4-di-O-acetyl-β-D-digitoxosyl)-(1→4)-O-(3-O-acetyl - β - D-digitoxosyl)-(1→4)-(3-O-acetyl-β-D - digitoxosyl)] - 3β,12β,14β,21-tetrahydroxy-12β-acetyl-20-oxo-5β-pregnane and 5.4 gm. (24 millimols) of 2-diethylphosphono-2-methoxy-acetic acid and condensation with 5.0 gm. (24 millimols) of dicyclohexylcarbodiimide, the corresponding α-ketol-phosphono-ethyl acetate was obtained.

Rf-value: 0.15 (silica gel; solvent system: ethyl acetate/benzene=4/1).

Upon treating the obtained product with 2.74 gm. (24 millimols) of potassium tert.-butylate, 1.85 gm. (17.6% of theory) of 22-methoxy-digoxin pentaacetate were obtained, which were subjected to column chromatography on silica gel (system: benzene/ethyl acetate=2/1).

$[\alpha]_D^{20} = +63°$ (in methanol, c.=1)
Rf-value: 0.65 (silica gel; solvent system: ethyl acetate/benzene=4/1).

(b) 22-methoxy-digoxin

Starting from 1.0 gm. (0.98 millimols) of 22-methoxy-digoxin pentaacetate and hydrolysis with 600 mgm. (3.4 millimols) of potassium carbonate in 100 ml. of aqueous methanol analogous to Example 1(b), 680 mgm. (75.5% of theory) of 22-methoxy-digoxin were obtained, which were subjected to chromatography on silica gel (system: ethyl acetate/ethanol=4/1).

$[\alpha]_D^{20} = +17°$ (in methanol, c.=0.7)
Rf-value: 0.55 (silica gel; solvent system: ethyl acetate/ethanol=87/13).

EXAMPLE 6

(a) 22-ethoxy-digoxin pentaacetate

Starting from 9.67 gm. (10 millimols) of 3β-[O-3,4-di-O-acetyl-β-D-digitoxosyl) - (1→4) - O - (3-O-acetyl-β-D-digitoxosyl) - (1→4) - (3 - O - acetyl-β-D-digitoxosyl)]-3β,12β,14β,21 - tetrahydroxy - 12β - acetyl - 20 - oxo - 5β-pregnane and 3.12 gm. (13 millimols) of 2-diethylphosphono - 2 - ethoxy - acetic acid and condensation with 2.9 gm. (14 millimols) of dicyclohexylcarbodiimide analogous to Example 1(a), the corresponding α-ketol-phosphono-ethyl acetate was obtained.

Rf-value: 0.25 (silica gel; solvent system: ethyl acetate/benzene=4/1).

Upon treating the obtained product with 1.5 gm. (13.4 millimols) of potassium tert.-butylate, 2.5 gm. (24% of theory) of 22-ethoxy-digoxin pentaacetate were obtained which were subjected to column chromatography on silica gel (system: benzene/ethyl acetate=16/10).

$[\alpha]_D^{20} = +75°$ (in methanol, c.=2.4)
Rf-value: 0.6 (silica gel; solvent system: ethyl acetate/benzene=4/1).

(b) 22-ethoxy-digoxin

Starting from 1.0 gm. (1 millimol) of 22-ethoxy-digoxin pentaacetate and hydrolysis with 1.0 gm. (5.7 millimols) of potassium carbonate in 100 ml. of aqueous methanol analogous to Example 1(b), 800 mgm. (97% of theory) of 22-ethoxy-digoxin were obtained, which were subjected to chromatography on silica gel (system: ethyl acetate/ethanol=5/1).

$[\alpha]_D^{20} = +15°$ (in methanol, c.=1.1)

Rf-value: 0.6 (silica gel; solvent system: ethyl acetate/ethanol=87/13).

EXAMPLE 7

(a) 22-n-butoxy-digoxin pentaacetate

Starting from 9.67 gm. (10 millimols) of 3β-[O-(3,4-di - O - acetyl - β - D - digitoxosyl)-(1→4)-O-(3-O-acetyl-β - D - digitoxosyl) - (1→4) - (3-O-acetyl-β-D-digitoxosyl)] - 3β,12β,14β,21 - tetrahydroxy - 12β - acetyl - 20-oxo-5β-pregnane and 3.5 gm. (13 millimols) of 2-diethyl-phosphono-2-n-butoxy-acetic acid and condensation with 2.9 gm. (14 millimols) of dicyclohexylcarbodiimide analogous to Example 1(a), the corresponding α-ketol-phosphono-ethyl acetate was obtained.

Rf-value: 0.2 (silica gel; solvent system: ethyl acetate/benzene=4/1).

Upon treating the obtained product with 1.5 gm. (13.4 millimols) of potassium tert.-butylate, 3.1 gm. (29% of theory) of 22-n-butoxy-digoxin pentaacetate were obtained, which were subjected to column chromatography on silica gel (system: benzene/ethyl acetate=2/1).

$[\alpha]_D^{20} = +71°$ (in methanol, c.=1.2)

Rf-value: 0.6 (silica gel; solvent system: ethyl acetate/benzene=4/1).

(b) 22-n-butoxy-digoxin

Starting from 1.56 gm. (1 millimol) of 22-n-butoxy-digoxin pentaacetate and hydrolysis with 1.0 gm. (5.75 millimols) of potassium carbonate in 100 ml. of aqueous methanol analogous to Example 1(b), 550 mgm. (65% of theory) of 22-n-butoxy-digoxin were obtained, which were subjected to chromatography on silica gel (system: ethyl acetate/ethanol=25/1).

$[\alpha]_D^{20} = +12.8°$ (in methanol, c.=1)

Rf-value: 0.65 (silica gel; solvent system: ethyl acetate/ethanol=87/13).

EXAMPLE 8

(a) 22-methyl-digoxin pentaacetate

Starting from 9.67 gm. (10 millimols) of 3β-[O-(3,4-di-O - acetyl - β - D - digitoxosyl)-(1→4)-O-(3-O-acetyl-β-D-digitoxosyl) - (1→4) - (3 - O - acetyl-β-D-digitoxosyl)]-3β,12β,14β,21 - tetrahydroxy - 12β - acetyl - 20 - oxo - 5β-pregnane and 2.73 gm. (13 millimols) of 2-diethyl-phosphono-2-methyl-acetic acid and condensation with 2.9 gm. (14 millimols) of dicyclohexyl carbodiimide analogous to to Example 1(a), the corresponding α-ketol-phosphono-ethyl acetate was obtained.

Rf-value: 0.25 (silica gel; solvent system: ethyl acetate/benzene=4/1).

Upon treating the obtained product with 1.5 gm. (13.4 millimols) of potassium tert.-butylate, 3 gm. (30% of theory) of 22-methyl-digoxin pentaacetate were obtained, which were subjected to column chromatography on silica gel (system: benzene/ethyl acetate=2/1).

$[\alpha]_D^{20} = +69°$ (in methanol, c.=1.7)

Rf-value: 0.6 (silica gel; solvent system: ethyl acetate/benzene=4/1).

(b) 22-methyl digoxin

Starting from 1.0 gm. (1 millimol) of 22-methyl-digoxin pentaacetate and hydrolysis with 1.0 gm. (5.75 millimols) of potassium carbonate in 100 ml. of aqueous methanol analogous to Example 1(b), 500 mgm. (63% of theory) of 22-methyl-digoxin were obtained, which were subjected to column chromatography on silica gel (system: ethyl acetate/ethanol=25/1).

$[\alpha]_D^{20} = +10°$ (in methanol, c.=0.4)

Rf-value: 0.6 (silica gel; solvent system: ethyl acetate/ethanol=87/13).

EXAMPLE 9

(a) 22-fluoro-digitoxin tetraacetate

Starting from 11 gm. (12.1 millimols) of 3β-[O-(3,4-di - O - acetyl - β - D - digitoxosyl)-(1→4)-O-(3-O-acetyl-β - D - digitoxosyl) - (1→4) - (3 - O - acetyl - β - D - digitoxosyl)] - 3β,14β,21 - trihydroxy - 20 - oxo - 5β - pregnane and 3.4 gm. (15.8 millimols) of 2-diethyl-phosphono-2-fluoro-acetic acid and condensation with 3.45 gm. (16.7 millimols) of dicyclohexylcarbodiimide analogous to Example 1(a), 13 gm. (97% of theory) of the corresponding α-ketol-phosphono-ethyl acetate were obtained.

Rf-value: 0.35 (silica gel; solvent system: ethyl acetate/benzene=4/1)

Upon treating the obtained product (14 gm.=12.7 millimols) with 1.80 gm. (16.0 millimols) of potassium tert.-butylate, 5.1 gm. (42.5% of theory) of 22-fluoro-digitoxin tetraacetate were obtained, which were subjected to chromatography on silica gel (system: benzene/ethyl acetate=2/1).

$[\alpha]_D^{20} = +60°$ (in methanol, c.=1.8)

Rf-value: 0.7 (silica gel; solvent system: ethyl acetate/benzene=4/1).

(b) 22-fluoro-digitoxin

Starting from 3.5 gm. (3.7 millimols) of 22-fluoro-digitoxin tetraacetate and hydrolysis with 50 ml. of absolute methanol half-saturated with ammonia, 1.2 gm. (42% of theory) of 22-fluoro-digitoxin were obtained, which were subjected to chromatography on silica gel (system: ethyl acetate/benzene=4/1), M.P.: 237–239° C. (decomp.: from ethyl acetate).

$[\alpha]_D^{20} = +18°$ (in methanol, c.=0.4)

Rf-value: 0.6 (silica gel; solvent system: ethyl acetate/ethanol=87/13).

EXAMPLE 10

(a) 22-fluoro-digoxin pentaacetate

Analogous to Example 1(a), starting from 11.7 gm. (12.1 millimols) of 3β-[O-(3,4-di-O-acetyl-β-D-digitoxosyl)-(1→4) - O - (3 - O - acetyl - β - D-digitoxosyl)-(1→4)-(3 - O - acetyl - β-D-digitoxosyl)]-3β,12β,14β,21-tetrahydroxy-12β-acetyl-20-oxo-5β-pregnane and 3.4 gm. (15.8 millimols) of 2-diethyl-phosphono-2-fluoro-acetic acid and condensation with 3.45 gm. (16.7 millimols) of dicyclohexylcarbodiimide analogous to Example 1(a), 12 gm. (85% of theory) of the corresponding α-ketol-phosphono-ethyl acetate were obtained.

Rf-value: 0.20 (silica gel; solvent system: ethyl acetate/benzene=4/1).

Upon treating the obtained product (14 gm.=12 millimols) with 1.8 gm. (16 millimols) of potassium tert.-butylate, 3.5 gm. (29% of theory) of 22-fluoro-digoxin pentaacetate were obtained, which were then subjected to chromatography on silica gel (system: benzene/ethyl acetate=2/1).

$[\alpha]_D^{20} = +74°$ (in methanol, c.=1.1)

Rf-value: 0.30 (silica gel; solvent system: ethyl acetate/benzene=1/1).

(b) 22-fluoro-digoxin

Analogous to Example 1(b), starting from 3.0 gm. (3 millimols) of 22-fluoro-digoxin pentaacetate and hydrolysis with 50 ml. of absolute methanol half-saturated with ammonia, 1.5 gm. (63% of theory) of 22-fluoro-digoxin were obtained, which were subjected to chromatography on silica gel (system: ethyl acetate/benzene=6/1).

$[\alpha]_D^{20} = +23°$ (in methanol, c.=0.4)

Rf-value: 0.55 (silica gel; solvent system: ethyl acetate/ethanol=87/13).

EXAMPLE 11

(a) 22-chloro-digoxin pentaacetate

Starting from 11.4 gm. (11.8 millimols) of 3β-[O-(3,4 - di - O - acetyl - β - D - digitoxosyl) - (1→4) - O-(3 - O - acetyl - β - D - digitoxosyl) - (1→4) - (3 - O-acetyl - β - D - digitoxocyl)]-3β,12β,14β-tetrahydroxy-12β - acetyl - 20 - oxo - 5β - pregnane and 4 gm. (17.3 millimols) of 2-diethylphosphono-2-chloro-acetic acid and condensation with 3.82 gm. (18.5 millimols) of dicyclohexylcarbodiimide analogous to Example 1(a), 12.6 gm. (91% of theory) of the corresponding α-ketol-phosphono-ethyl acetate were obtained.

Rf-value: 0.20 (silica gel; solvent system: ethyl acetate/benzene=4/1).

Upon treating the obtained product (15 gm.=12.7 millimols) with 2.0 gm. (17.8 millimols) of potassium tert.-butylate, 3.0 gm. (23% of theory) of 22-chloro-digoxin pentaacetate were obtained, which were subjected to chromatography on silica gel (system: benzene/ethyl acetate=2/1).

$[\alpha]_D^{20} = +53°$ (in methanol, c.=1.0)
Rf-value: 0.30 (silica gel; solvent system: ethyl acetate/benzene=1/1).

EXAMPLE 12

(a) 22-n-butyl-digoxin pentaacetate

Starting from 7.4 gm. (7.65 millimols) of 3β - [O - (3,4 - di- O - acetyl - β - D - digitoxosyl) - (1→4) - O-(3 - O - acetyl - β - D - digitoxosyl) - (1→4) - (3 - O-acetyl - β - D - digitoxosyl)] - 3β,12β,14β,21-tetrahydroxy - 12β - acetyl - 20 - oxo - pregnane and 2.52 gm. (10 millimols) of 2 - diethylphosphono - 2 - n - butyl-acetic acid and condensation with 2.27 gm. (11 millimols) of dicyclohexylcarbodiimide analogous to Example 1(a), 8.5 gm. (92.5% of theory) of the corresponding α-ketol-phosphono-ethyl acetate were obtained.

Rf-value: 0.10 (silica gel; solvent system: ethyl acetate/benzene=4/1).

Upon treating the obtained product (9 gm.=7.5 millimols) with 1.15 gm. (10.2 millimols) of potassium tert.-butylate, 1.2 gm. (15% of theory) of 22-n-butyl-digoxin pentaacetate were obtained, which were subjected to chromatography on silica gel (system: benzene/ethyl acetate=2/1).

$[\alpha]_D^{20} = +57°$ (in methanol, c.=1.3)
Rf-value: 0.35 (silica gel; solvent system: benzene/ethyl acetate=1/1).

(b) 22-n-butyl-digoxin

Starting from 0.65 gm. (0.65 millimol) of 22-n-butyl-digoxin penetaacetate and hydrolysis with 0.62 gm. (3.55 millimols) of potassium carbonate in 50 ml. of methanol and 2 ml. of water analogous to Example 1(b), 520 mgm. (98% of theory) of 22-n-butyl-digoxin were obtained, which were subjected to chromatography on silica gel (system: ethyl acetate/ethanol=20/1).

$[\alpha]_D^{20} = +5.4°$ (in methanol, c.=0.5)
Rf-value: 0.55 (silica gel; solvent system: ethyl acetate/ethanol=87/13).

EXAMPLE 13

(a) 22-n-butyl-digitoxin tetraacetate

Starting from 6.95 gm. (7.65 millimols) of 3β-[O-(3,4 - di - O - acetyl - β - D - digitoxosyl) - (1→4) - O-(3 - O - acetyl - β - D - digitoxosyl) - (1→4) - (3 - O-acetyl - β - D - digitoxosyl)] - 3β,14β,21-trihydroxy-20-oxo-5β-pregnane and 2.52 gm. (10 millimols) of 2-diethylphosphono-2-n-butyl-acetic acid and condensation with 2.27 gm. (11 millimols) of dicyclohexylcarbodiimide analogous to Example 1(a), 8 gm. (91.5% of theory) of the corresponding α-ketol-phosphono-ethyl acetate were obtained.

Rf-value: 0.15 (silica gel; solvent system: ethyl acetate/benzene=4/1).

Upon treating the obtained product (8.8 gm.=7.8 millimols) with 1.15 gm. (10.2 millimols) of potassium tert.-butylate, 1.1 gm. (14.5% of theory) of 22-n-butyl-digitoxin tetraacetate were obtained, which were then subjected to chromatography on silica gel (system: benzene/ethyl acetate=2/1).

$[\alpha]_D^{20} = +50°$ (in methanol, c.=0.7)
Rf-value: 0.4 (silica gel; solvent system: ethyl acetate/benzene=1/1).

(b) 22-n-butyl-digitoxin

Starting from 0.55 gm. (0.557 millimol) of 22-n-butyl-digitoxin tetraacetate and hydrolysis with 0.45 gm. (2.58 millimols) of potassium carbonate in 50 ml. of methanol and 2 ml. of water analogous to Example 1(b), 400 mgm. (88% of theory) of 22-n-butyl-digitoxin were obtained, which were subjected to chromatography on silica gel (system: ethyl acetate/ethanol=20/1).

$[\alpha]_D^{20} = +9.2°$ (in methanol, c.=0.7)
Rf-value: 0.6 (silica gel; solvent system: ethyl acetate/benzene=1/1).

EXAMPLE 14

22-methyl-digitoxin tetraacetate

A mixture consisting of 0.2 gm. (0.25 millimol) of 22-methyl-digitoxin, 20 ml. of pyridine and 20 ml. of acetanhydride was allowed to stand for 4 days at room temperature. After completion of the reaction the tetraacetate formed thereby was precipitated by addition of ice water. The precipitate was dissolved in ethyl acetate, and the solution was extracted twice with aqueous 5% sodium bicarbonate and water, dried over sodium sulfate and evaporated to dryness in vacuo. 0.23 gm. (95% of theory) of 22-methyl-digitoxin tetraacetate were obtained by chromatography on silica gel.

Rf-value: 0.66 (silica gel; solvent system: ethyl acetate/benzene=4/1)
$[\alpha]_D^{20} = +55°$ (in methanol, c.=1.9).

EXAMPLE 15

(a) 22-fluoro-digitoxin tetra-trichloroethylcarbonate

Starting from 1.8 gm. (1.118 millimols) of 3β-[3,4-di-O-trichloroethoxycarbonyl - β - D - digitoxosyl)-(1→4) -O-(3-O-trichloroethoxycarbonyl - β - D - digitoxosyl)-(1→4)-O-(3-O-trichloroethoxycarbonyl - β - D - digitoxosyl)]-14β,21-dihydroxy - 5β - pregnane-20-one and 0.314 gm. (1.46 millimols) of 2-di-ethylphosphono - 2 - fluoro-acetic acid and condensation with 0.32 gm. (1.545 millimols) of dicyclohexylcarbodiimide analogous to Example 1(a), 2.16 gm. of the corresponding α-keto-phosphono-ethyl acetate was obtained.

Rf-value: 0.65 (silica gel; solvent system: ethyl acetate).

Upon treating the obtained product with 0.166 gm. (1.47 millimols) of potassium tert.-butylate (0.6 gm.) (32.5% of theory) of the compound named in the title of this example was obtained.

Rf-value: 0.75 (silica gel; solvent system: ethyl acetate).

(b) 22-fluoro-digitoxin 0.6 gm. (0.363 millimol) of 22-fluoro-digitoxin tetra-trichloroethylcarbonate were dissolved in 10 ml. of glacial acetic acid and the solution was shaken vigorously for 90 minutes in the presence of 0.5 gm. of zinc powder. Then, the reaction mixture was filtered, the filtrate was diluted with water and extracted several times with ethyl acetate. The combined extracts were washed with saturated aqueous sodium bicarbonate and then with water, dried over sodium sulfate and evaporated in vacuo. By chromatography on silica gel, 0.21 gm. (75.1% of theory) of 22-fluoro-digitoxin was obtained, which was identical to the compound obtained in Example 9(b).

EXAMPLE 16

22-fluoro-digoxin penta-tetrahydropyranyl ether

Starting from 8 gm. (6.9 millimols) of $3\beta$-[3,4-di-O-tetrahydropyranyl - $\beta$ - D - digitoxosyl)-(1→4)-O-(3-O-tetrahydropyranyl - $\beta$ - D - digitoxosyl)]-12$\beta$-tetrahydro-$\beta$-D digitoxosyl) - (1→4) - O - (3-O-tetrahydropyranyl pyranyloxy - 14$\beta$,21 - dihydroxy-5$\beta$-pregnane-20-one and 1.92 gm. (8.96 millimols) of fluoro-phosphono-acetic acid and condensation with 1.96 gm. (9.53 millimols) of dicyclohexylcarbodiimide analogous to Example 1(a), 9.3 gm. of the corresponding $\alpha$-ketol-phosphonoethyl acetate were obtained.

Rf-value: 0.5 (silica gel; solvent system: ethyl acetate/benzene=4/1).

Upon treating the obtained product with 1.03 gm. (9.15 millimols) of potassium tert.-butylate 2.49 gm. (30% of theory) of the compound named in the title of this example were obtained.

Rf-value: 0.7 (silica gel; solvent system: ethyl acetate/benzene=4/1.

EXAMPLE 17

(a) 22-fluoro-digoxin penta-trimethylsilyl ether

Starting from 8 gm. (7.17 millimols) of $3\beta$-[O-(3,4-di-O-trimethylsilyl - $\beta$ - D - digitoxosyl)-(1→4)-O-(3-O-trimethylsilyl - $\beta$ - D - digitoxosyl)-(1→4)-O-(3-O-trimethylsilyl - $\beta$ - D - digitoxosyl)]-14$\beta$,21-dihydroxy-5$\beta$-pregnane-20-one and 2.0 gm. (9.33 millimols) of 2-diethylphosphono - 2 - fluoro-acetic acid and condensation with 2.04 gm. (9.9 millimols) of dicyclohexylcarbodiimide analogous to Example 1(a), 9.4 gm. of the corresponding $\alpha$-ketol-phosphono-ethyl acetate were obtained.

Rf-value: 0.2 (silica gel; solvent system: ethyl acetate/benzene=4/1).

Upon treating the obtained product with 1.07 gm. (9.5 millimols) of potassium-tert.-butylate, 2.59 gm. (31% of theory) of the compound named in the title of this part of the example were obtained, which were subjected to chromatography on silica gel.

Rf-value: 0.6 (silica gel; solvent system: ethyl acetate/benzene=4/1).

(b) 22-fluoro-digoxin

A solution of 2.36 gm. of 22-fluoro-digoxin penta-trimethylsilyl ether in 100 ml. of methanol was admixed with 10 ml. of a buffer solution of pH 2.0 (Citrisol, Merck) and allowed to stand for 60 minutes. The solution was evaporated in vacuo, the residue was taken up in ethyl acetate, and the solution was washed first with aqueous sodium bicarbonate and then with water. After it had been dried over sodium sulfate it was evaporated to dryness in vacuo. 1.31 gm. (80.5% of theory) of 22-fluoro-digoxin were obtained, which was identical to the compound obtained in Example 9(b).

The compounds according to the present invention, that is those embraced by Formula I above, have useful pharmacodynamic properties. More particularly, the compounds of the instant invention produce a positive inotropic effect upon the heart of warm-blooded animals, such as guinea pigs. The cardiac activity of the compounds of the present invention was ascertained on isolated spontaneously beating auricles of the guinea pig, using the standard test methods of Knaffl-Lenz, Arch. exp. Path. Pharmacol. 135, 259 (1928), and Hatcher, Am. J. Pharmacy 82, 360 (1910).

For pharmaceutical purposes the compounds according to the present invention are administered to warm-blooded animals perorally or parenterally as active ingredients in customary dosage unit compositions that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.002 to 0.034 mgm./kg. body weight.

The following examples illustrate a few cardiac-active dosage unit compositions comprising a compound of the present invention as an active ingredient and represent the best modes contemplated of putting the invention into practical use. The parts are parts by weight unless otherwise specified.

EXAMPLE 18

Tablets

The tablet composition was compounded from the following ingredients:

| | Parts |
|---|---|
| 22-methyl-digoxin | 0.25 |
| Lactose | 85.75 |
| Potato starch | 30.00 |
| Gelatin | 3.00 |
| Magnesium stearate | 1.00 |
| | 120.00 |

Preparation

The digoxin compound was intimately admixed with ten times its weight of lactose. This mixture was admixed with the remaining lactose and with the potato starch, and the resulting mixture was granulated with an aqueous 10% solution of the gelatin through a screen of 1.5 mm. mesh-size. The granulate was dried at 40° C., again passed through a screen of 1 mm. mesh-size and admixed with the magnesium stearate. The finished composition was compressed into 120 mgm.-tablets in a conventional tablet making machine. Each tablet contained 0.25 mgm. of the digoxin compound and, when perorally administered to a warm-blooded animal of about 60 kg. body weight in need of such treatment, produced a very good positively inotropic action upon the heart.

EXAMPLE 19

Coated pills

The pill core composition was compounded from the following ingredients:

| | Parts |
|---|---|
| 22-fluoro-digitoxin | 0.25 |
| Lactose | 32.25 |
| Corn starch | 15.00 |
| Polyvinyl pyrrolidone | 2.00 |
| Magnesium stearate | 0.50 |
| | 50.00 |

Preparation

The digitoxin compound was intmiately admixed with ten times its weight of lactose, the mixture was admixed with the remaining lactose and the corn starch, and the resulting mixture was granulated through a screen of 1 mm. mesh-size with an aqueous 15% solution of the polyvinyl pyrrolidone. The granulate was dried at 40° C. and again passed through the above screen, admixed with the magnesium stearate, and the composition was compressed into 50 mgm.-pill cores.

The thus prepared cores were coated according to known methods with a shell consisting essentially of sugar and talcum, and the finished coated pills were polished with beeswax. Each pill contained 25 mgm. of the digitoxin compound and, when perorally administered to a warm-blooded animal of about 60 kg. body weight in need of such treatment, produced a very good positively inotropic action upon the heart.

EXAMPLE 20

Coated pills

The pill core composition was compounded from the following ingredients:

| | Parts |
|---|---|
| 22-butoxy-digoxin | 0.125 |
| Lactose | 32.375 |
| Corn starch | 15.000 |
| Polyvinyl pyrrolidone | 2.000 |
| Magnesium stearate | 0.500 |
| | 50.000 |

Preparation

The coated pills were prepared in a manner analogous to that described in Example 19. Each pill contained 0.125 mgm. of the digoxin compound and, when perorally administered to a warm-blooded animal of about 60 kg. body weight in need of such treatment, produced a very good positively inotropic action upon the heart.

EXAMPLE 21

Drop solution

The solution was compounded from the following ingredients:

| | Parts |
|---|---|
| 22-methyl-digitoxin | 0.0125 |
| Saccharin sodium | 0.3 |
| Sorbitol | 0.1 |
| Ethanol | 30.0 |
| Flavoring | 1.0 |
| Distilled water, q.s. ad 100.0. | |

Preparation

The digitoxin compound and the flavoring were dissolved in the ethanol (solution A). The sorbitol and the saccharin sodium were dissolved in the distilled water (solution B). Solution A was admixed with solution B, and the resulting solution was filtered until free from suspended matter. 1 ml. (about 20 drops) of the finished solution contained 0.125 mgm. of the digitoxin compound and, when perorally administered to a warm-blooded animal of about 60 kg. body weight in need of such treatment, produced a very good positively inotropic action upon the heart.

EXAMPLE 22

Hypodermic solution

The solution was compounded from the following ingredients:

| | Parts |
|---|---|
| 22-butoxy-digoxin polyethyleneglycol 600 | 0.25 |
| Tartaric acid | 150.0 |
| Distilled water, q.s. ad 3000.0, parts by vol. | |

Preparation

The tartaric acid, the polyethyleneglycol and the digoxin compound were dissolved, one after the other, in distilled water. The solution was diluted with distilled water to the indicated volume, and the solution was filtered until free from suspended matter. The filtrate was filled into white 3 ml.-ampules in an atmosphere of nitrogen, and the filled ampules were sealed and sterilized for 20 minutes at 120° C. Each ampule contained 0.25 mgm. of the digoxin compound, and when the contents thereof were administered by intravenous injection to a warm-blooded animal of about 60 kg. body weight in need of such treatment, a very effective positively inotropic action upon the heart was produced.

EXAMPLE 23

Suppositories

The suppository composition was compounded from the following ingredients:

| | Parts |
|---|---|
| 22-methyl-digitoxin | 0.25 |
| Lactose | 4.75 |
| Cocoa butter | 1695.00 |
| | 1700.00 |

Preparation

The digitoxin compound was intimately admixed with the lactose, and the mixture was homogeneously blended with an immersion homogenizer into the cocoa butter which had previously been melted and cooled to 40° C. The composition was then cooled to 37° C., and 1700 mgm.-portions thereof were poured into cooled suppository molds. Each suppository contained 0.25 mgm. of the digitoxin compound and, when administered by the rectal route to a warm-blooded animal of about 60 kg. body weight in need of such treatment, produced a very effective positively inotropic action upon the heart.

Analogous results were obtained when any one of the other cardenolide glycosides embraced by Formula I was substituted for the particular cardenolide glycosides in Examples 18 through 23. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

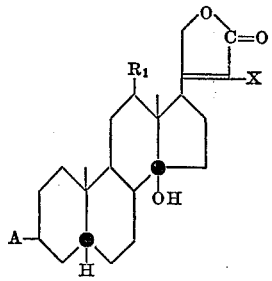

wherein
 $R_1$ is hydrogen, hydroxy or alkanoyloxy of 1 to 3 carbon atoms,
 X is fluorine, chlorine or alkoxy of 1 to 4 carbon atoms, and A is

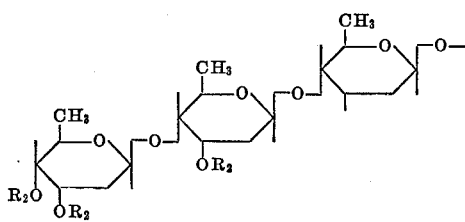

where
 $R_2$ is hydrogen or alkanoyl of 1 to 3 carbon atoms.
2. A compound according to claim 1, which is 22-n-butoxy-digitoxin.
3. A compound according to claim 1, which is 22-methoxy-digoxin.
4. A compound according to claim 1, which is 22-fluoro-digitoxin.

5. A compound according to claim 1, which is 22-fluoro-digoxin.

6. A compound of the formula

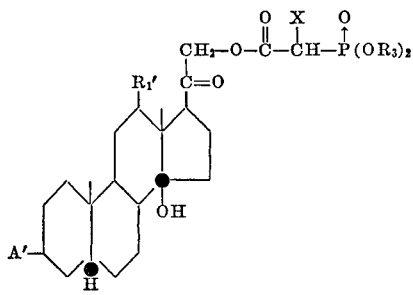

wherein
$R_1'$ is hydrogen or YO-, where Y is hydrogen or a protective group for hydroxyl selected from the group consisting of lower alkanoyl, tri(lower alkyl) silyl, tetrahydropyranyl and trichloroethylcarbonyl,
$R_3$ is lower alkyl,
X is fluorine, chlorine, alkyl of 1 to 4 carbon atoms or alkoxy of 1 to 4 carbon atoms, and A' is

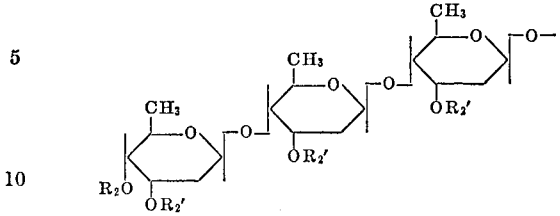

where $R_2'$ has the same meaning as Y.

References Cited
UNITED STATES PATENTS

| | | | |
|---|---|---|---|
| 3,514,441 | 5/1970 | Satoh et al. | 260—210.5 |
| 3,531,462 | 9/1970 | Satoh et al. | 260—210.5 |
| 3,538,078 | 11/1970 | Kaiser et al. | 260—210.5 |

LEWIS GOTTS, Primary Examiner

J. R. BROWN, Assistant Examiner

U.S. Cl. X.R.

424—182